Sept. 18, 1934.  M. REINSTEIN  1,973,996
PEAR PEELING MACHINE
Filed March 31, 1931   6 Sheets-Sheet 1
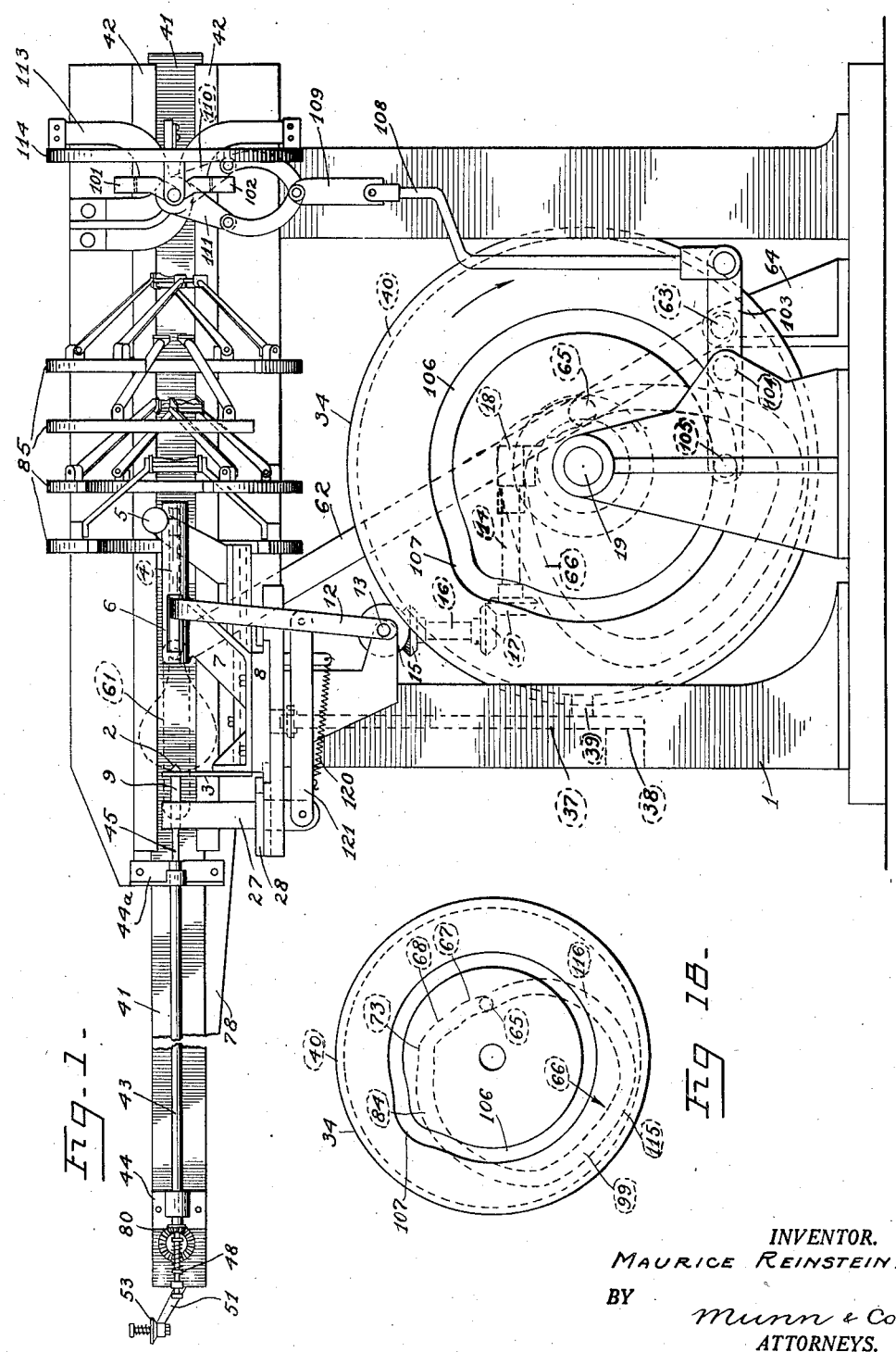
INVENTOR.
MAURICE REINSTEIN.
BY
Munn & Co.
ATTORNEYS.

Sept. 18, 1934.　　　M. REINSTEIN　　　1,973,996
PEAR PEELING MACHINE
Filed March 31, 1931　　6 Sheets-Sheet 2
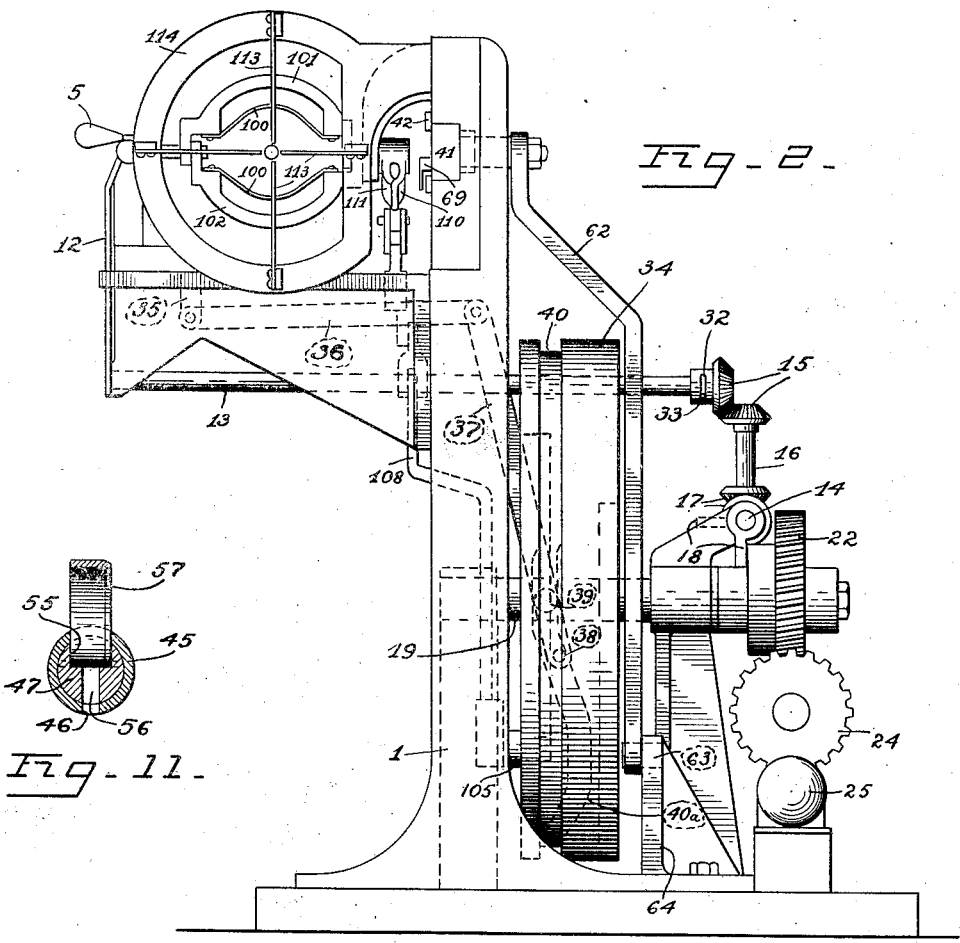
Fig-2-
Fig-11-
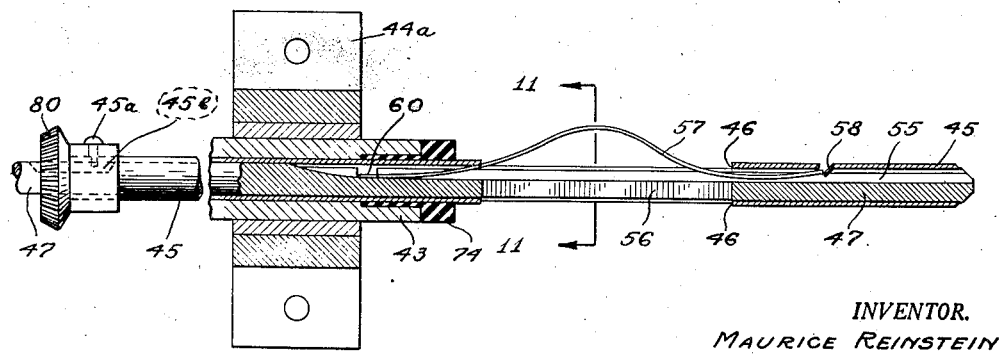
Fig-10-
INVENTOR.
MAURICE REINSTEIN
BY
Munn & Co
ATTORNEYS.

Sept. 18, 1934.    M. REINSTEIN    1,973,996
PEAR PEELING MACHINE
Filed March 31, 1931    6 Sheets-Sheet 3
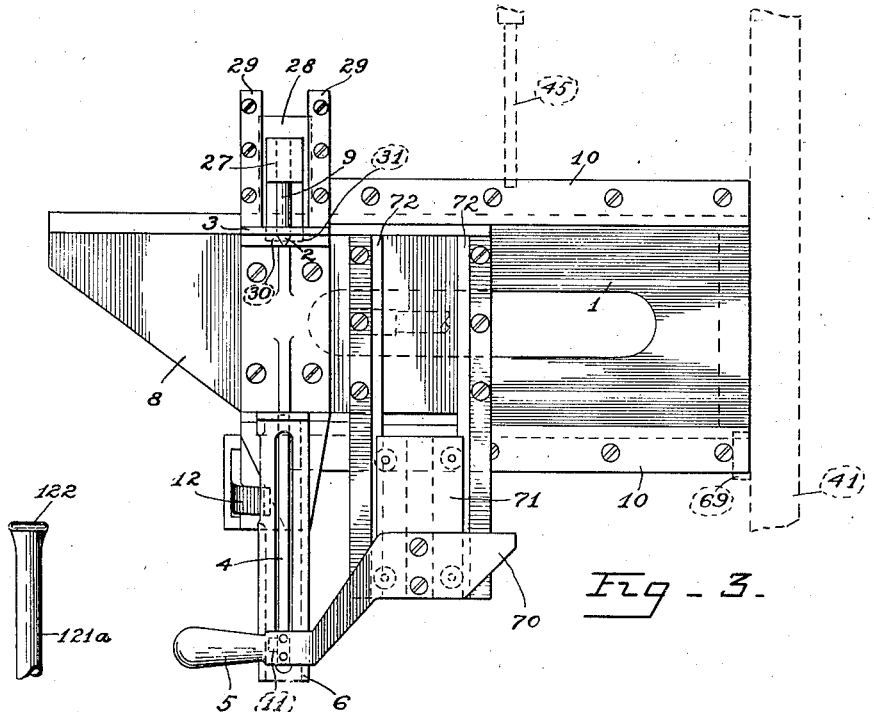
Fig-3.
Fig-16.
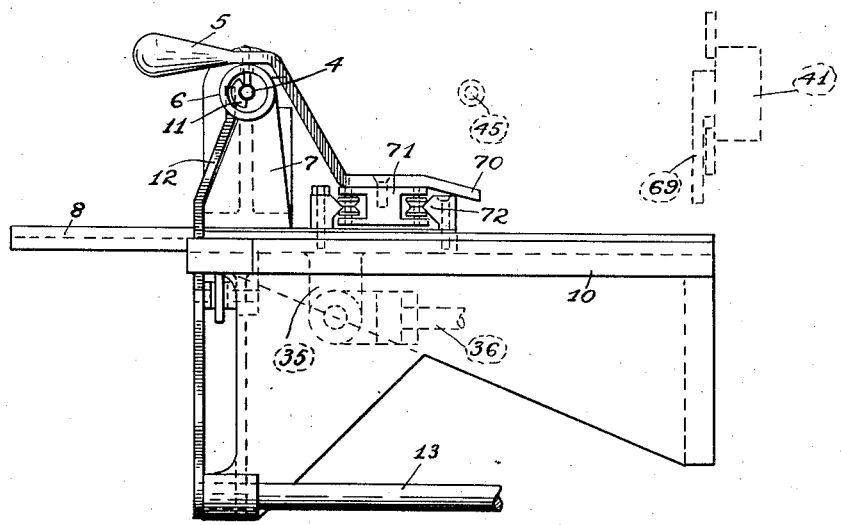
Fig-4.
INVENTOR.
MAURICE REINSTEIN
BY
Munn & Co.
ATTORNEYS.

Sept. 18, 1934.   M. REINSTEIN   1,973,996
PEAR PEELING MACHINE
Filed March 31, 1931   6 Sheets-Sheet 4
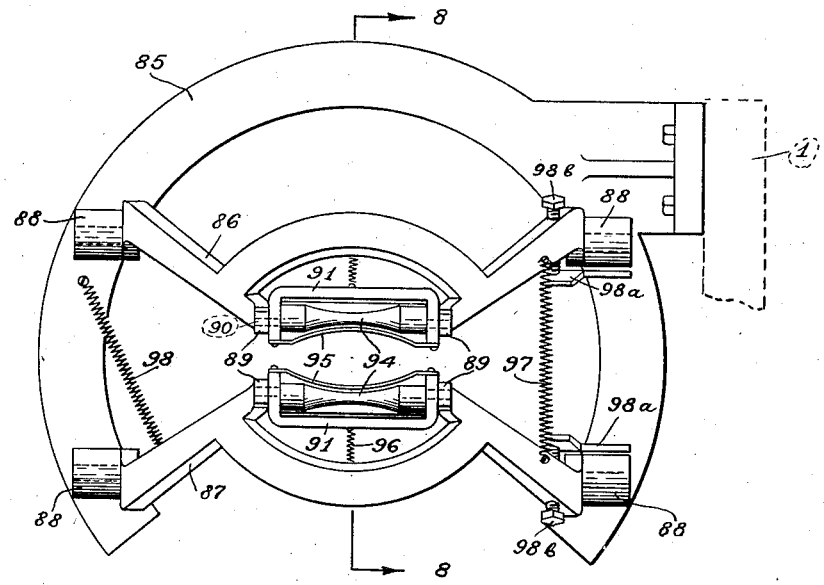
Fig-7-
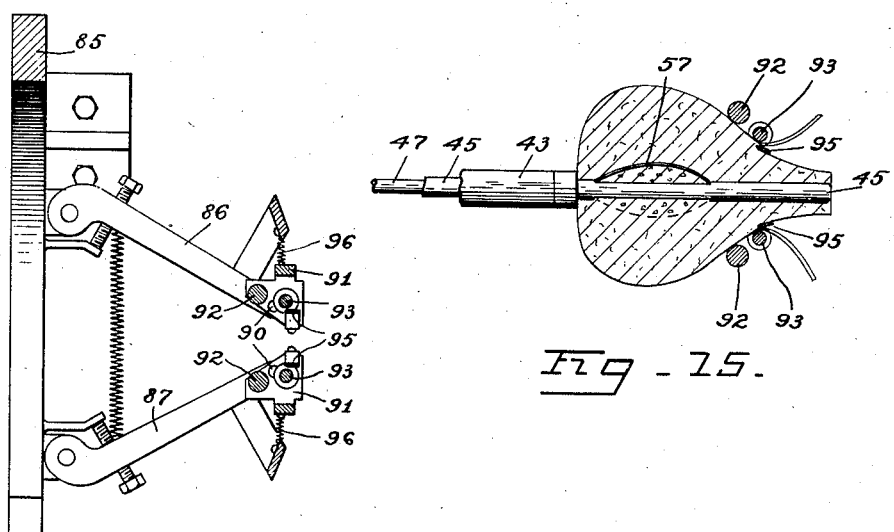
Fig-8-   Fig-15-
INVENTOR.
MAURICE REINSTEIN
BY
Munn & Co
ATTORNEYS.

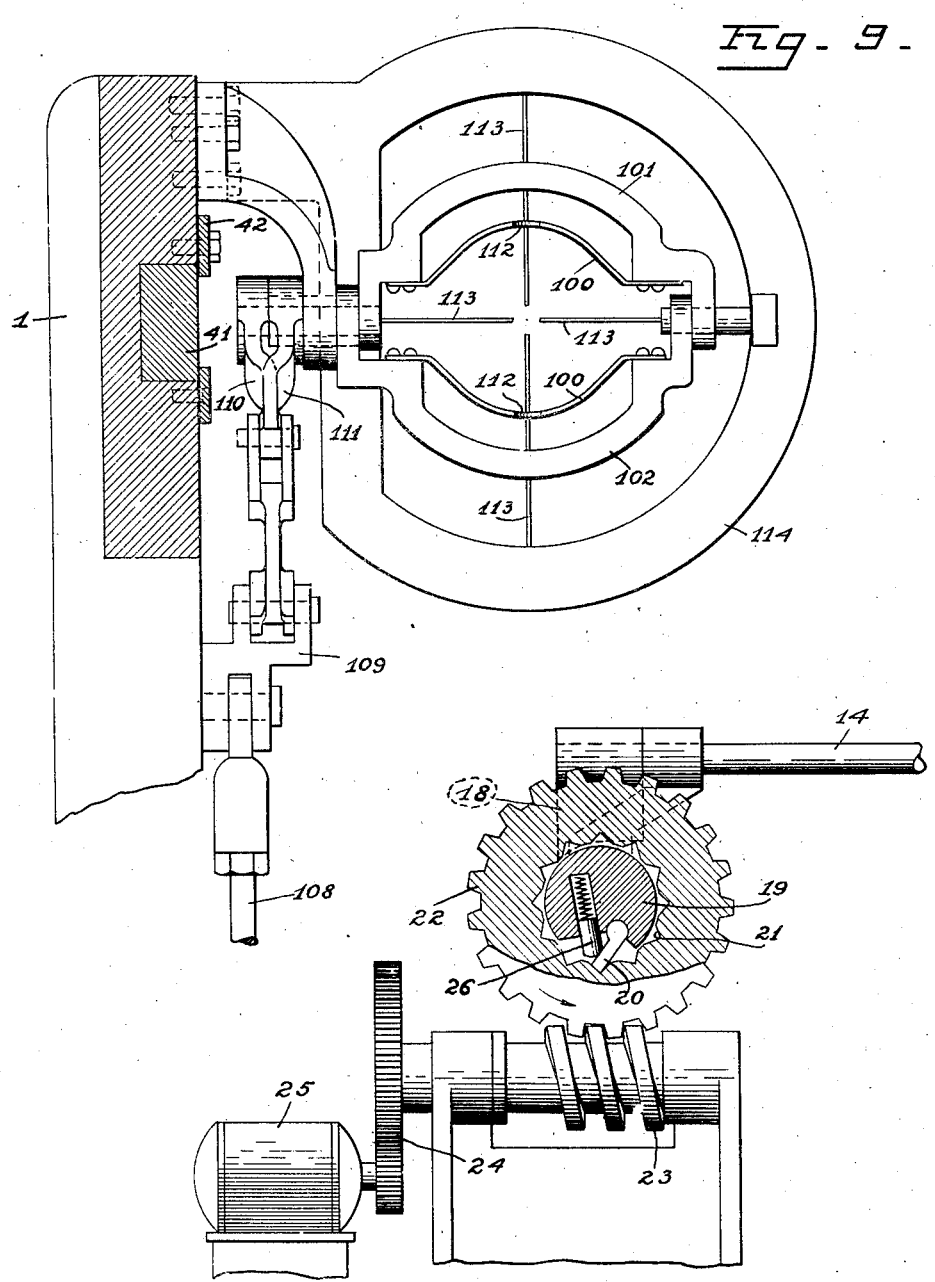

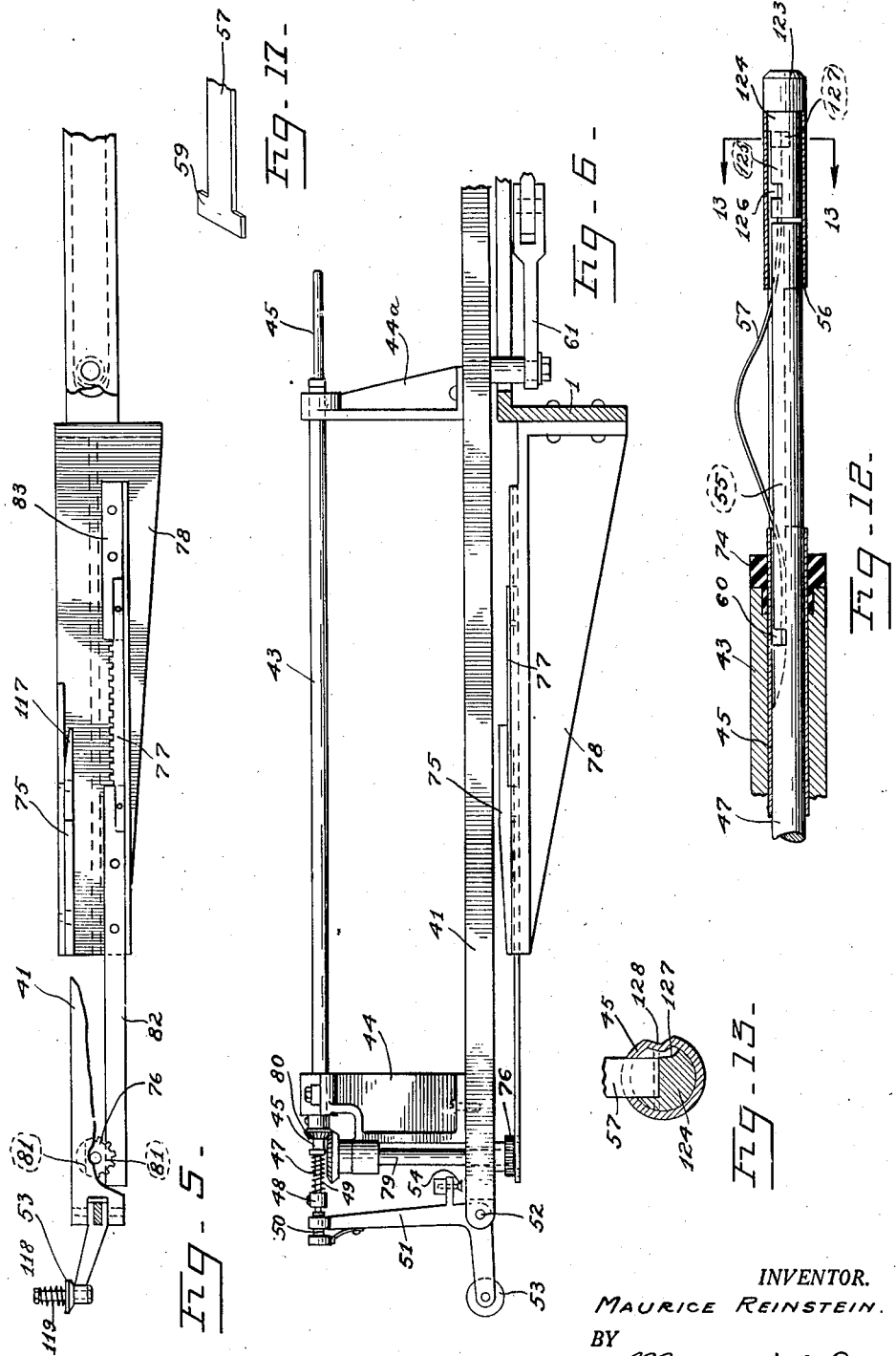

Patented Sept. 18, 1934

1,973,996

UNITED STATES PATENT OFFICE 1,973,996

PEAR PEELING MACHINE

Maurice Reinstein, San Francisco, Calif.

Application March 31, 1931, Serial No. 526,740

18 Claims. (Cl. 146—33)

My invention relates to improvements in a pear peeling, coring, and splitting machine and it consists of the combinations, constructions and arrangements hereinafter described and claimed.

An object of my invention is to provide a pear peeling, coring and splitting machine in which the machine automatically cores, peels and splits a pear after the operator places the pear in a predetermined position and moves the control handle. The coring and peeling are done simultaneously so that the peeling knives prevent the rotation of the pear while the coring knife is revolved within the pear. The coring knife is enclosed in a tube and the tube first enters the fruit whereupon the coring knife is gradually flexed while being rotated and in this way the knife will make a spiral cut in the center of the fruit for severing the core from the fruit. The pear is moved in a longitudinal direction during the peeling operation and past a number of pairs of knives, the knives in each pair being preferably diametrically opposed to each other.

After the pear has been cored and peeled I provide novel means for cutting the blossom end from the pear and then for splitting the pear into any desired number of parts.

Other objects and advantages will appear in the following specification, and the novel features of the device will be particularly pointed out in the appended claims.

My invention is illustrated in the accompanying drawings forming a part of this application, in which Figure 1 is a front elevation of the device;

Figure 2 is an end view;

Figure 3 is a plan view of the pear feeding mechanism;

Figure 4 is a side view of the feeding mechanism;

Figure 5 is a front elevation of the mechanism for actuating the coring knife;

Figure 6 is a bottom plan view of Figure 5;

Figure 7 is a side view of one set of peeling knives;

Figure 8 is a section along the line 8—8 of Figure 7;

Figure 9 is a side view of the blossom end cutting knives and the splitting knives;

Figure 10 is a sectional view through the coring knife;

Figure 11 is a section along the line 11—11 of Figure 10;

Figure 12 is a sectional view through the modified form of the coring knife;

Figure 13 is a section along the line 13—13 of Figure 12;

Figure 14 shows the driving mechanism and a sectional view through the clutch mechanism;

Figure 15 is a schematic view showing the simultaneous coring and peeling operations;

Figure 16 is a modified form of a pear-centering tube;

Figure 17 is a perspective view of one end of the coring knife; and

Figure 18 is a view of the cam.

It is best to describe the device step by step and to set forth the description of each feature of the device after it is described before proceeding to the description of the next feature.

A frame, indicated generally at 1, and of any desired shape, is provided and supports all of the operating mechanism. I will first describe the

*Pear centering mechanism*

The stem end of the pear is removed and then the blossom end is placed upon a pointed portion 2 (see Figures 1 and 3) and pressed against a plate 3 through which the portion 2 projects. The operator holds the pear against the plate 3 and then aligns the stem end with a tubular member 4 (see Figures 1, 3 and 4).

Figure 4 shows the tube 4 as being connected to a handle 5 and Figures 1 and 3 show the tube 4 as being slidable in a supporting member 6 which in turn is carried by a casting 7 the casting being secured to a slide 8. The same casting 7 supports the plate 3 and the tube 4 is axially aligned with the pointed end 2 of a cylindrical member 9.

The operator in moving the handle 5 forces the end of the tube 4 into the stem end of the pear and further movement will move the tube 4 entirely through the center of the fruit. In this way the fruit is properly positioned with respect to the operations to follow.

I will now describe the means for moving the pear into alignment with a coring mechanism and with a peeling mechanism. I have already stated that the casting 7 is carried by a slide 8 and Figure 3 shows the slide as being movable in guides 10, these guides being carried by the frame 1. The moving of the handle 5 toward the pear carries a projection 11 (see Figures 3 and 4) which strikes an arm 12 and swings the arm so as to rock a shaft 13. Figure 1 shows the end view of the shaft 13 and illustrates how this shaft is connected to a shaft 14 by a set of bevelled gears 15, a stub shaft 16, and a set of bevelled gears 17. The shaft 14 is shown in Figures 2 and 14 and carries a cam 18 which normally extends over a driven shaft 19 and in the path of a pawl 20 swingably mounted in the shaft 19. When the pawl 20 contacts with the cam 18 it is held out of engagement with ratchet teeth 21 formed in a worm gear 22.

The worm gear is constantly rotated in a counter clockwise direction in Figure 14 by a worm 23, and gearing 24 connecting the worm with a motor 25. The motor is constantly rotating the worm gear 22, and the moving of the arm 12 by the handle 5 swings the cam 18 away from the pawl 20 and permits a spring pressed plunger 26 to swing the pawl into engagement with one of the ratchet teeth 21. The shaft 19 will now be connected to the worm gear 22 and will rotate therewith.

Before the cam 18 is swung into inoperative position the tube 4 (see Figure 3) will have passed entirely through the fruit and then the projection 11 on the tube 4 will engage with the arm 12 and by means of a link 121, connecting the arm 12 with a slide 28, will move the slide. The slide will carry with it an upright 27 which in turn carries the member 9 having the pointed end 2, and this movement will remove the end 2 from the fruit. The slide 28 moves between the guides 29, carried by the frame 1, and has a projection 30 which is removed from a recess 31 in the slide 8. The slide 28 removes the projection 30 from the recess 31 prior to the cam 18 being swung into inoperative position.

In order to effect this release of the slide 8 before the cam 18 is moved I provide a slot 32 in one of the gears 15 (see Figure 2) and this slot slidably receives a pin 33 carried by the shaft 13. The gear 15 carrying the slot is rotatably mounted on the shaft 13 and the shaft must be rocked a predetermined distance before the cam 18 will be operatively connected thereto. This distance is sufficient to permit the tube 4 to move the projection 30 and free the slide 8. It will be noted from Figure 3 that the projection 11 moves a considerable distance before striking the arm 12.

The shaft 19 when operatively connected to the motor 25 in the manner just described rotates a large cam 34 through one complete revolution. The slide 8 is operatively connected to the cam 34 by a lug 35 (see Figures 2 and 4) depending from the slide, this lug being connected by a link 36 to an arm 37. The arm 37 is pivoted to the frame 1 at 38 (see Figures 1 and 2) and carries a roller 39 that rides in a peripheral groove 40 in the cam 34. The groove 40 is of the shape shown in Figure 2 and it will be noted that a short portion of the groove is curved in the manner shown at 40a.

The initial rotation of the cam 34 will cause the roller 39 to move into the curved portion 40a and this will move the slide 8 to the right in Figures 2 and 3 and into a position to align the axis of the tube 4 with the axis of a coring mechanism presently to be described. The cam 34 moves through approximately 40 degrees of an arc while moving the slide 8 to the right in Figure 3. The groove 40a has a straight portion which extends through approximately 33 degrees of an arc and the silde 8 will remain stationary while the roller 39 moves through this portion. During this movement of the cam 34 through 33 degrees the coring mechanism is actuated in a manner hereinafter described.

Portions 40a has another inclined part in the groove which will return the slide 8 practically to initial position, but not enough to permit the projection 30 to again enter the recess 31. The slide 8 remains in this position until all of the other operations of the machine have been completed.

Coring mechanism

It is best now to describe the coring mechanism and to show its relation with the other parts of the machine. In Figure 1, I show a main slide 41 that extends throughout the width of the machine and is slidable in guides 42 supported by the frame 1. The slide 41 moves transversely to the slide 8 and Figure 6 shows the slide as carrying a tubular member 43. The tubular member 43 is connected to the slide 41 by a bracket 44 and is slidably mounted in a bracket 44a that is carried by the frame 1.

Within the tube 43, I mount a sleeve 45, and this sleeve is designed to be moved longitudinally within the tube a predetermined distance. The sleeve has slots 46, and slidably receives a rod 47. The rod extends through the length of the sleeve 45 and projects beyond the end of the sleeve as shown in Figure 10. A collar 48 is adjustably secured to the rod 47, and a spring 49 urges the rod to the left in Figure 6 and against a set screw 50 adjustably carried by a bell crank lever 51. The lever 51 is pivoted to the slide 41 at 52 and carries a roller 53 at its free end. An adjustable screw 54 carried by the bell crank lever 51 limits the movement of the lever in a clockwise direction in Figure 6.

The end of the rod 47 shown in Figures 10 and 11 is grooved at 55 and is provided with a slot 56 communicating with the groove. A flexible coring knife 57 has a width corresponding to the width of the groove 55 and is normally received within the groove. One end of the knife bears against an inwardly bent portion 58 on the sleeve 45, while the other end has a T-shaped portion as shown at 59 in Figure 17, and this portion is received in transverse recesses 60 communicating with the groove 55.

It will be seen from this construction that when the rod 47 is moved with respect to the sleeve 45, the blade 57 will be flexed and will be projected through the slot 46 as shown in Figure 10. The sleeve 45 and rod 47 are also rotated during the flexing of the knife and this will cause the knife to form a spiral cut in the core of the fruit.

I will now describe how the corer enters the fruit and how the coring operation takes place. It will be understood that the slide 8 has been positioned so as to aline the tube 4 with the axis of the rod 47. The slide remains in a stationary position, while the corer is advanced into the fruit. In Figure 6, I show a link 61 connected to the main slide 41, and in Figure 1, I show the link 61 as being connected to an arm 62 that is pivoted at 63 to a support 64 carried by the main frame 1. A roller 65 is carried by the arm 62 and travels in a cam groove indicated generally at 66 formed in the rear face of the cam 34. This cam groove is shown in Figure 18. While the cam 34 is moving the slide 8, the roller 65 is moving through the portion 67 of the groove 66, and there will, therefore, be no movement imparted to the main slide 41. As soon, however, as the slide 8 properly positions the tube 4 in alinement with the sleeve 45, the roller 65 will have reached the portion 68 of the groove 66 and will swing the arm 62 to move the main slide 41 to the right in Figures 1 and 6. This movement will cause the end of the tube 45 to enter the fruit.

At the same time as the sleeve 45 enters the fruit, a projection 69 (see Figures 3 and 4) carried by the main slide 41 will strike an extension 70 of the handle 5 and will move the extension so as to cause the tube 4 to be withdrawn from the pear as the sleeve 45 enters the pear. The extension 70 is carried by a slide 71 (see Figure 3) which in turn rides in guides 72 secured to the slide 8.

The portion 68 of the groove 66 (see Figure 18) is long enough to advance the sleeve 45 entirely through the fruit and to withdraw the tube 4 from the fruit. The roller 65 now passes through a portion 73 of the groove 66, and will hold the main slide 41 stationary while the slide 8 is being moved away from the fruit, the slide carrying with it the tube 4. The pear is now supported by the sleeve 45 and rests against a rubber collar 74 carried by the tubular member 43 (see Figure 10).

The initial movement of the main slide 41 in moving the sleeve 45 into the fruit brings the roller 53 adjacent to a cam 75 (see Figures 5 and 6) and also brings a gear 76 adjacent to a rack 77. The cam 75 and rack 77 are carried by a casting 78 which in turn is secured to the main frame 1.

Further movement of the slide 41, caused by the roller 65 entering a portion 84 of the groove 66 will bring the roller 53 into contact with the cam 75 and will swing the bell crank lever 51 for advancing the rod 47 in the sleeve 45. This will flex the knife 57 as already described. At the same time the gear 76 will engage with the rack 77 and will be rotated by the rack. The gear 76 is operatively connected to the sleeve 45 by means of a shaft 79 and bevelled gears 80. Figure 10 shows one of the gears connected to the sleeve 45 by a screw 45a. The screw 45a is slidably received in a slot 45b in the rod 47. The number of teeth on the rack 77 is such as to rotate the sleeve 45 and rod 47 through a few revolutions. This will cause the blade 57 to spirally cut the core and sever it from the fruit.

The gear 76 has two flattened portions 81, (see Figures 5 and 6). The portion 81 rides on a guide 82 (see Figure 5) which in turn is secured to the casting 78. After the gear 76 has been rotated by the rack 77, the other flattened portion rides on a guide 83, also secured to the casting 78, and the guide prevents further rotation of the gear and a like rotation of the coring knife 57.

While the flat portion 81 is riding on the guide 83, the roller 53 leaves the cam 75 and permits the spring 49 to return the rod 47 to normal position which permits the knife 57 to drop back into the groove 55. The entire coring operation takes place while the roller 65 is moving through the groove portion 84 of the cam groove 66, (see Figure 18). During this same movement of the main slide 41, the fruit is being peeled, and it is the peeling knives which prevent the fruit from rotating while it is being cored. I will now describe the

Peeling operation

Figure 1 shows a number of supports 85 for carrying peeling knives. These supports are secured to the main frame 1, and each pivotally carries two peeling knives. The knives on each support are arranged diametrically opposite to each other, and each set of knives is placed in the path of the moving fruit so that the fruit is entirely peeled when moved past the last set of knives. I show four sets of peeling knives in Figure 1, although this number may be changed without departing from the spirit and scope of my invention.

Since each set of peeling knives and support 85 is the same as every other set, a description of one will suffice. Figures 7 and 8 show one of the peeling devices in detail. The support 85 is in the shape of a split circle and carries two U-shaped arms 86 and 87. The legs of the U are inclined and are pivoted in bearings 88 carried by the support 85.

The looped ends of the U-shaped arms carry lugs 89 and pins 90 are passed through the lugs and pivotally support the roller and knife carrying frames 91. Figures 8 and 15 show two rollers 92 and 93 carried by each frame 91, the roller 93 being provided with a reduced curved portion 94 for conforming with the curvature of the fruit.

A curved skin-peeling knife 95 has its ends secured to the ends of the U-shaped frame 91 and its body portion conforming to the curved portion 94 and spaced from it a distance equal to the thickness of the skin. In Figure 15, I show how the fruit is supported by the sleeve 45 and how the movement of the fruit to the right causes the rollers 92 and 93 to follow the contour of the fruit and the knives 95 to cut only skin deep.

Springs 96 swing the frames 91 about their pivots 90 and hold the rollers 92 and 93 in contact with the fruit while the fruit passes thereby. Springs 97 and 98 yieldingly move the arms 86 and 87 toward each other so that the knives 95 will engage with the small end of the fruit. The springs 97 and 98 also permit the arms 86 and 87 to move away from each other, thus allowing the large portion of the fruit to pass between the knives. Stops 98a and adjustable screws 98b limit the movement of the arms toward each other.

As already stated, the sets of knives 95 are arranged radially around the path through which the fruit moves so that the fruit will be entirely peeled. After the fruit has been simultaneously peeled and cored, it is temporarily stopped while the blossom end of the fruit is cut off.

Blossom end cutting device

Reference to Figure 18 shows a portion 99 of the cam groove 66 where no movement will be imparted to the roller 65 while it passes through this part of the groove. This will cause the main slide 41 to stand still and likewise the fruit. The fruit will be stopped in a position where it will be engaged by the blossom end cutting knives.

These knives are shown in Figures 1, 2 and 9. Figure 9 shows how the blossom end cutting knives 100 are curved and positioned for letting the fruit pass therebetween. The knives 100 are secured to frames 101 and 102 that are rotatable about the same axis. The fruit is stopped in a position where the knives 100 will cut the blossom end when the knives are swung toward each other.

The means for moving the frames 101 and 102 comprises a lever 103 (see Figure 1) pivoted at 104 and carrying a roller 105 slidable in a cam groove 106 in the cam 34. The greater part of the groove 106 is the same distance from the center of the cam and therefore no movement is imparted to the lever 103. While the lever 62, however, is standing still due to the roller 65 traveling in the groove portion 99, the roller 105 travels in a humped portion 107 of the groove 106 and swings the lever 103 for raising and lowering a link 108.

This link is connected by a toggle 109 (see Figure 1) to the arms 110 and 111, which in turn are integral to the frames 101 and 102 respectively. The upward movement of the link 108 will swing the knives 100 toward each other, and the pear is positioned so that the blossom end is cut off by the knives. The knives have recesses 112 for receiving the sleeve 45 when the knives are swung into cutting position.

After cutting the blossom end, the knives 100 are immediately swung away and the pear is moved through

Fruit splitting knives

These knives 113 are shown in Figures 1, 2 and 9 and are carried by a support 114 mounted on the main frame 1. Figure 1 shows the knives 113 curved toward the frames 101 and 102 and these knives will partly cut the fruit while it is being brought into position to have the blossom end cut off. Figure 5 shows four knives, although this number may be varied, and further shows the knives spaced from each other a distance sufficient for the sleeve 45 to pass therebetween.

The roller 65 leaves the groove portion 99 when the blossom end cutting operation is completed and passes into a groove portion 115 which moves the roller and causes the main slide 41 to complete its stroke to the right in Figure 1. This last movement of the main slide or bar 41 is sufficient to carry the fruit past the knives 113, and these knives split the cored fruit into the desired number of pieces. The pieces of fruit now drop into any desired receptacle or may be conveyed away.

The roller 65 now enters the final portion 116 of the cam groove 66 and returns the main slide to starting position ready to receive the next fruit. The roller 53 in being returned, (see Figure 5) has its conical portion strike a cam surface 117 on the cam 75 and this moves the roller 53 laterally on its stub shaft 118 and against the compression of a spring 119, whereby the roller is prevented from being raised by the cam 75 and the blade 57 is not flexed during the return movement of the main slide 41 and will therefore not interfere with the peeling knives.

When the main slide 41 reaches the end of its return movement, the cam groove 40 shifts the roller 39 laterally a slight distance (see Figure 2) and this moves the slide 8 back to starting position (see Figure 3) and registers the recess 31 in the slide with the projection 30 carried by the slide 28. Figure 1 shows the slide 28 urged to the right by a spring 120 and this spring causes the projection to enter the recess. The link 121 connects the slide 28 with the arm 12 and moves the arm back into starting position.

This movement of the arm 12 rocks the shaft 13 a distance sufficient to swing the cam 18 from the dotted line position in Figure 2, back into the full line position. The cam engages with the pawl 20 (see Figure 14) in the manner already described and frees the shaft 19 from the motor 25. The machine now comes to a stop and the parts are again set in motion only when the handle 5 is moved for centering a new fruit.

In Figure 16, I show a slightly modified form of a tube 121a which will take the place of the tube 4. The tube 121a differs from the tube 4 in that it has an elliptical mouth 122.

Figures 12 and 13 show a slightly modified form of coring mechanism. This device has the same parts as the device shown in Figures 10 and 11 and in addition has a removable cap 123 with a cylindrical portion 124 receivable in the sleeve 45. The portion 124 has a slot 125 designed to be aligned with the groove 55 and to receive the T-shaped end of the knife 57. The knife has both ends T-shaped in this instance.

A transverse groove 126 communicating with the groove 125 receives the T-shaped end. A second transverse groove 127 of the shape shown in Figures 12 and 13 communicates with the groove 125 and receives a depressed portion 128 formed in the sleeve 45.

In assembling this form of the device, the rod 47 is extended beyond the end of the sleeve 45 while the end of the knife 57 is placed in the grooves 125 and 126. The cap 123 with the rod 47 is moved into the sleeve 45, the inwardly extending projection 128 moving along the groove 125 until it comes opposite to the groove 127. The cap is now rotated through a slight arc for moving the projection 128 into the groove 127. In this way the cap is locked in place.

Although I have shown and described several embodiments of my invention, it is to be understood that the same are susceptible of various changes and I reserve the right to employ such changes as may come within the scope of the claims hereto annexed.

1. In a fruit coring machine, a sleeve having a slot therein, a rod slidable in the sleeve and having a groove registering with the slot, a flexible coring knife normally received in said groove, one end of said knife bearing against a stop in the rod the other end bearing against a stop in the sleeve, and means for moving the rod with respect to the sleeve for flexing the knife and causing it to project through the slot, and means for rotating the sleeve and rod.

2. A fruit coring and peeling machine comprising a fruit-supporting member insertable into the fruit, a coring device carried by the member and normally being received therewithin, means for extending the coring device and for rotating it with respect to the fruit, whereby the fruit is cored, means for advancing the fruit during the coring operation, a plurality of skin peeling knives placed in the path of the fruit for peeling all of the skin, spring means for yieldingly holding the knives against the fruit, and means associated with each knife for causing it to follow the contour of the fruit and cut only to a predetermined depth, said knives being disposed in pairs, the knives of each pair simultaneously engaging with opposite sides of the fruit and holding the fruit against rotation while the fruit is being cored.

3. A coring device comprising a member designed to enter a fruit, a flexible coring knife normally disposed within the member, said member having a slot, and means for moving the ends of the knife toward each other, whereby the knife projects through the slot, said knife being rotatable with respect to the fruit for coring it.

4. In a coring and peeling machine, a fruit supporting and coring member designed to enter a fruit and carrying a knife, means for projecting the knife out of the member, means for rotating the member for causing the knife to core the fruit, means for moving the member forwardly during the coring operation and for carrying the fruit therewith, fruit peeling knives placed in the path of the fruit, said knives peeling the skin from the fruit and holding the fruit against rotation during the coring operation.

5. In a coring and peeling machine, a fruit supporting and coring member designed to enter a fruit and carrying a knife, means for projecting the knife out of the member, means for rotating the member for causing the knife to core the fruit, means for moving the member forwardly during the coring operation and for carrying the fruit therewith, fruit peeling knives placed in the path of the fruit, said knives peeling the skin from the fruit and holding the fruit against rotation during the coring operation and means for cutting off the end of the fruit.

6. In a coring and peeling machine, a fruit supporting and coring member designed to enter a fruit and carrying a knife, means for projecting the knife out of the member, means for rotating the member for causing the knife to core the fruit, means for moving the member forwardly during the coring operation and for carrying the fruit therewith, fruit-peeling knives placed in the path of the fruit, said knives peeling the skin from the fruit and holding the fruit against rotation during the coring operation, means for cutting off the end of the fruit, and means for cutting the peeled and cored fruit into the desired number of parts.

7. In a pear coring, peeling, and cutting machine comprising a manually operated pear centering device including a tubular member designed to enter a pear, means for aligning the member with a coring member, and means for moving the coring member into the fruit while removing the tube.

8. In a pear coring, peeling, and cutting machine comprising a manually operated pear centering device including a tubular member designed to enter a pear, means for aligning the member with a coring member, and means for moving the coring member into the fruit while removing the tube, means for causing the coring member to core the fruit while advancing the fruit, and knives placed in the path of the fruit for removing the skin while the fruit passes thereby, said knives holding the fruit against rotation while being cored.

9. In a pear coring, peeling, and cutting machine comprising a manually operated pear centering device including a tubular member designed to enter a pear, means for aligning the member with a coring member, and means for moving the coring member into the fruit while removing the tube, means for causing the coring member to core the fruit while advancing the fruit, knives placed in the path of the fruit for removing the skin while the fruit passes thereby, said knives holding the fruit against rotation while being cored and means for cutting off the end of the fruit.

10. In a pear coring, peeling, and cutting machine comprising a manually operated pear centering device including a tubular member designed to enter a pear, means for aligning the member with a coring member, and means for moving the coring member into the fruit while removing the tube, means for causing the coring member to core the fruit while advancing the fruit, knives placed in the path of the fruit for removing the skin while the fruit passes thereby, said knives holding the fruit against rotation while being cored, and means for cutting off the end of the fruit, and means for cutting the peeled and cored fruit into the desired number of parts.

11. A fruit-centering device comprising a coring member, a fruit-carrying slide movable transversely, a fruit-supporting member carried by the slide and manually movable into the fruit, a pin for centering one end of the fruit while the supporting member enters the other end, said supporting member removing the pin when the member enters the fruit, slide-moving means, means controlled by the movement of the supporting member for causing the slide-moving means to move the slide and align the supporting member with the coring member, and means for removing the supporting member while moving the coring member into the fruit.

12. In combination, a fruit supporting and moving member, fruit peeling and slicing knives placed in the path of the moving member, a coring knife carried by the member, fruit-centering means, means for moving the fruit-centering means into the path of the member, means for causing the member to enter the fruit and to pause while said second named means is returning the centering means to starting position, whereupon said third named means will then move the fruit past the peeling and slicing knives, while the centering means is receiving another fruit, and means for causing the coring knife to core the fruit while the peeling knives prevent the rotation of the fruit.

13. A fruit-coring mechanism comprising a coring member designed to enter the fruit, a coring knife mounted in the member, means for projecting the knife and including a bell-crank lever, a roller, and a cam, and means for rotating the coring member with the knife projected and including a gear and a rack, whereby the fruit is cored.

14. A coring mechanism comprising a coring member for entering and supporting a pear or the like, a coring knife carried by and normally housed within the member, a fixed cam, means for flexing the knife for causing it to project beyond the member and including a bell-crank lever actuated by the cam when the lever is moved past the cam and is actuated thereby, a fixed rack, and means for rotating the coring member while the knife is extended and including a gear movable over the rack, whereby the fruit is cored.

15. A coring mechanism comprising a coring member for entering and supporting a pear or the like, a coring knife carried by and normally housed within the member, a fixed cam, means for flexing the knife for causing it to project beyond the member and including a bell-crank lever actuated by the cam when the lever is moved past the cam and is actuated thereby, a fixed rack, means for rotating the coring member while the knife is extended and including a gear movable over the rack, and means for engaging with the fruit during the coring operation for holding it against rotation, said means peeling the fruit, whereby the fruit is cored and peeled.

16. A coring mechanism comprising a movable support, a tubular member carried thereby and having a rubber end, a sleeve carried by the tube and projecting beyond both ends, the end of the tube projecting beyond the rubber end having a slot therein, a rod slidable in the sleeve, a coring knife disposed in the sleeve and movable thru the slot when the rod is moved, a bell-crank lever for moving the rod, a fixed cam engageable with the lever for moving the rod in one direction, a spring for returning the rod, means for rotating the sleeve and including a gear, and a fixed rack placed in the path of the gear.

17. A coring mechanism comprising a movable support, a tubular member carried thereby and having a rubber end, a sleeve carried by the tube and projecting beyond both ends, the end of the tube projecting beyond the rubber end having a slot therein, a rod slidable in the sleeve, a coring knife disposed in the sleeve and movable thru the slot when the rod is moved, a bell-crank lever for moving the rod, a fixed cam engageable with the lever for moving the rod in one direction, a spring for returning the rod, means for rotating the sleeve and including a gear, a fixed rack placed in the path of the gear, and means for causing the bell-crank lever to be acted upon by said cam when the support is moved in one direction and to be inactive on the lever on the return movement.

18. In a coring mechanism, a tubular member having a flexible end, a sleeve carried by the member and having its projecting portion provided with a slot, a flexible coring knife normally disposed in the sleeve, means for buckling the knife for causing it to project thru the slot, said sleeve being insertable into a fruit, and means for causing a rotative movement between the fruit and sleeve for coring the fruit.

MAURICE REINSTEIN.